March 17, 1925.
W. F. RIDGE
STEERING WHEEL COVER
Filed Oct. 20, 1924
1,530,060
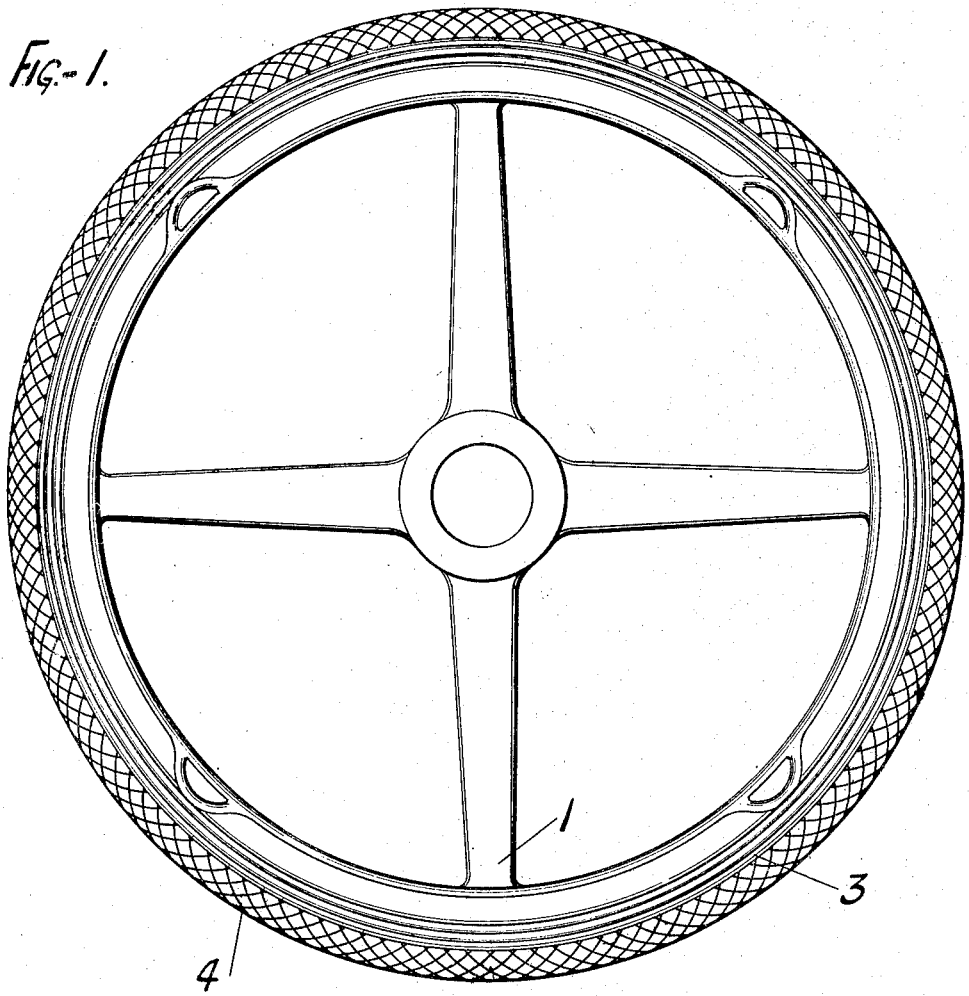
Fig.-1.
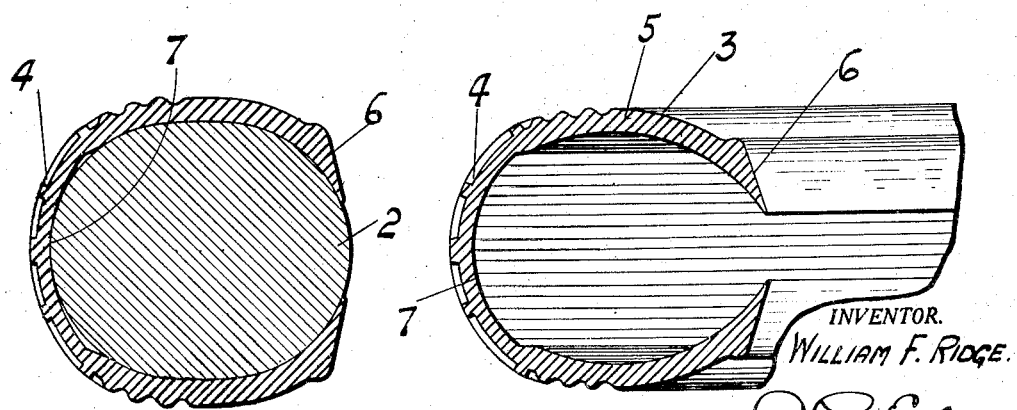
Fig.-2.
Fig.-3.
INVENTOR.
WILLIAM F. RIDGE.
BY ATTORNEY.

Patented Mar. 17, 1925.

1,530,060

UNITED STATES PATENT OFFICE.

WILLIAM F. RIDGE, OF AKRON, OHIO.

STEERING-WHEEL COVER.

Application filed October 20, 1924. Serial No. 744,529.

*To all whom it may concern:*

Be it known that I, WILLIAM F. RIDGE, a citizen of the United States, and a resident of Akron, county of Summit, State of Ohio, have invented certain new and useful Improvements in Steering-Wheel Covers, of which the following is a specification.

This invention relates to elastic sheaths or covers for steering wheels of automobiles, the specific object of the present invention being to improve upon the construction of such covers as shown in my prior Patent, No. 1,446,628, dated February 27, 1923, particularly with the object of preventing the steering wheel cover from slipping either circumferentially of the steering wheel or transversely thereof.

The cover is made from a continuous elastic band or sheath which is designed to be drawn over and contracted upon the steering wheel so that it remains in place by reason of its own elasticity or inherent contractile properties and without the aid of any fastening means whatever. In accordance with the principles of the present invention, the steering wheel cover is made of somewhat thinner gage rubber about its central periphery so that when it is stretched upon the wheel, the stresses will be greater at the tread or outer peripheral portion of the cover than about its sides. As a result the steering wheel cover will tend to cling tightly to the steering wheel and will not slip in either direction.

The new and improved form of steering wheel covers is illustrated in the embodiment of the invention shown in the drawings, but it will be apparent that other forms of covers may be designed which will have the essential features of the invention and be within the scope of the appended claims.

In the drawings:

Figure 1 is a plan view of a steering wheel with the elastic cover or sheath applied thereto;

Figure 2 is a section through the steering wheel with the cover applied; and

Figure 3 is a section of the cover removed from the wheel.

In the drawings, 1 represents a steering wheel of any suitable construction provided with the usual rim 2. The elastic cover or sheath is shown at 3 having the roughened outer periphery 4 by which the grip of the automobile driver is increased, and having, if desired, side walls 5 conforming to the rounded transverse periphery of the wheel and thickened bead like formations 6 on the inner edges of the cover, whereby the edges will tend to cling more closely to the sides of the wheel.

The outer portion of the cover, or that portion which is adjacent the outer rim of the steering wheel is made of thinner gage rubber than the balance of the cover, this being accomplished by the provision of a longitudinal channel 7 about the inner circumference of the cover.

As a result of the construction described, when the steering wheel cover is placed about the wheel, being normally less in circumference than the circumference of the wheel, the tendency to contract is augmented or localized in the thinner portion of the stock, so that there is a greater tendency for the cover to cling to the steering wheel about the outer periphery of the wheel. With this combination, therefore, the cover is prevented from slipping both circumferentially and transversely and is more efficient than a cover of equal thickness throughout.

The result sought to be accomplished may be obtained in other ways than that specifically described, and it is obvious that the principles of the invention may be applied to a cover which is normally flat or band shaped as well as to the cover shown which is normally curved transversely.

What is claimed is:

1. An elastic steering wheel cover which is held upon the wheel by its inherent contractile properties, provided with a wall of thinner gage about the outer periphery of the steering wheel.

2. An elastic steering wheel cover which is held upon the wheel by its inherent contractile properties, and provided with a channel about the inner periphery of the cover adjacent the outer rim of the wheel.

3. An elastic cover for steering wheels comprising a continuous rubber sheath and having means whereby the contractile properties of the sheath are augmented about the outer rim of the wheel.

4. In combination a steering wheel and an elastic cover therefore, adapted to be contracted about the wheel solely by its inherent contractile properties, and having a thinner portion extending about the cover adjacent the outer rim of the wheel.

WILLIAM F. RIDGE.